UNITED STATES PATENT OFFICE.

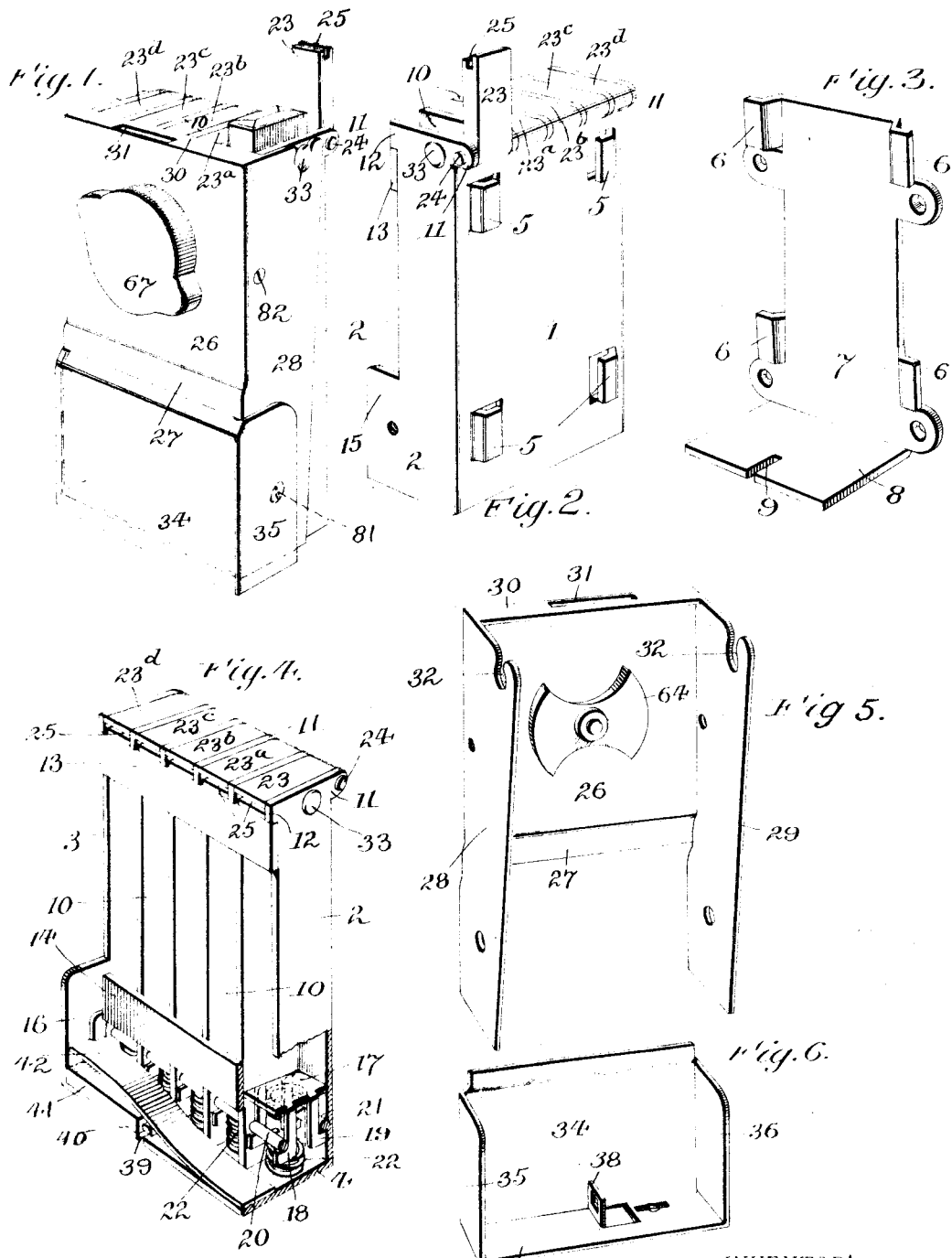
A. W. ROOVERS.
VENDING MACHINE.
APPLICATION FILED JULY 11, 1911.
1,106,848.
Patented Aug. 11, 1914.
4 SHEETS—SHEET 1.

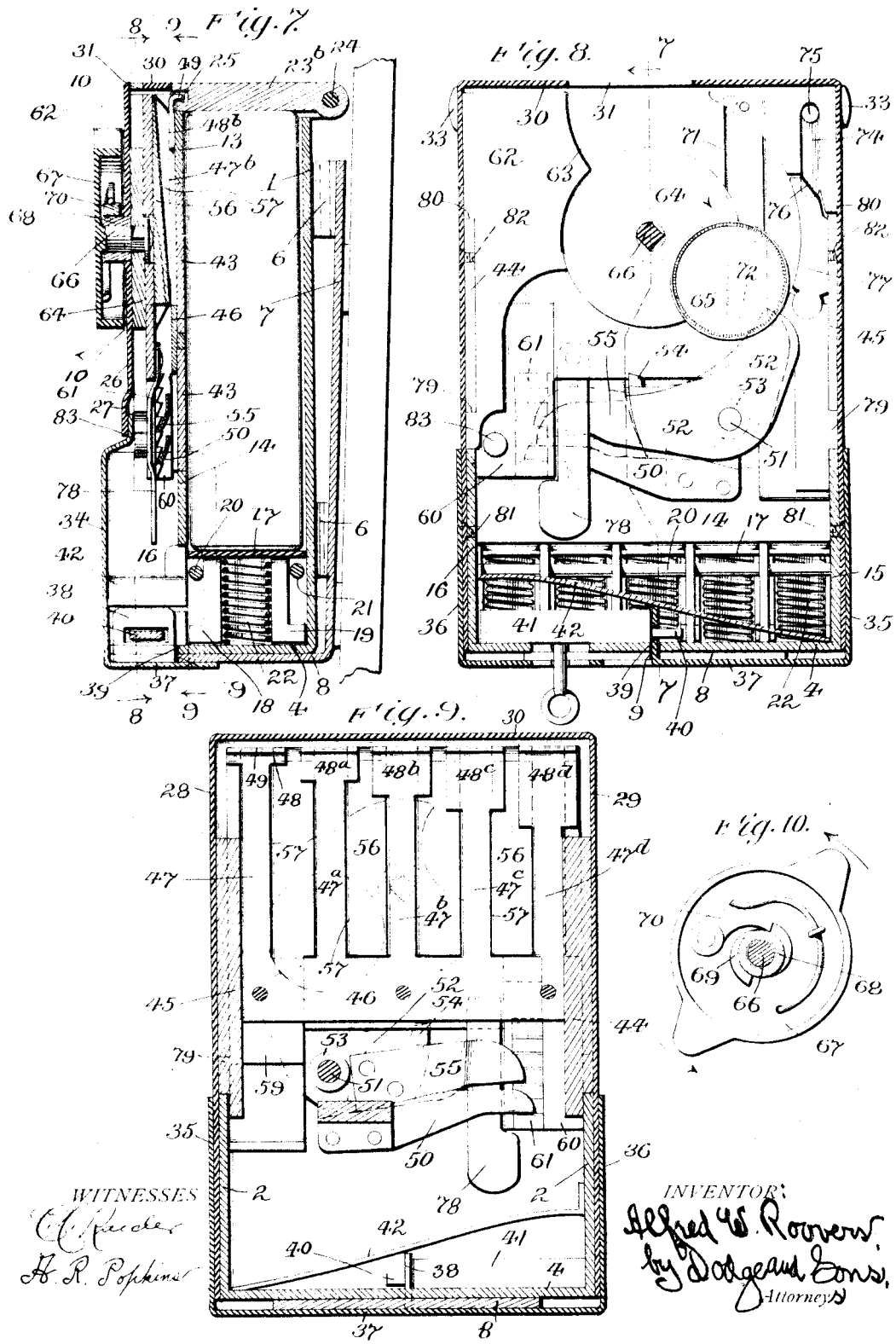

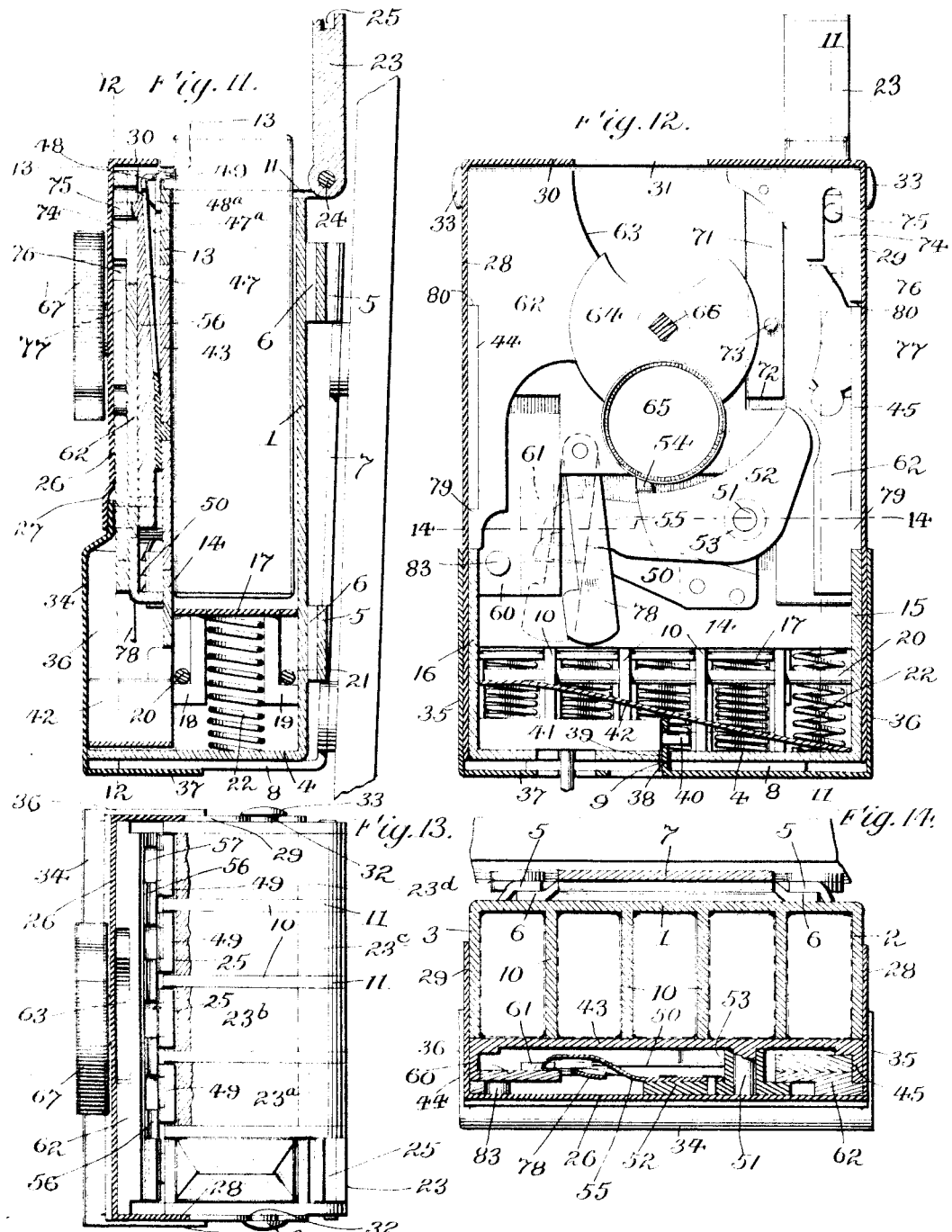

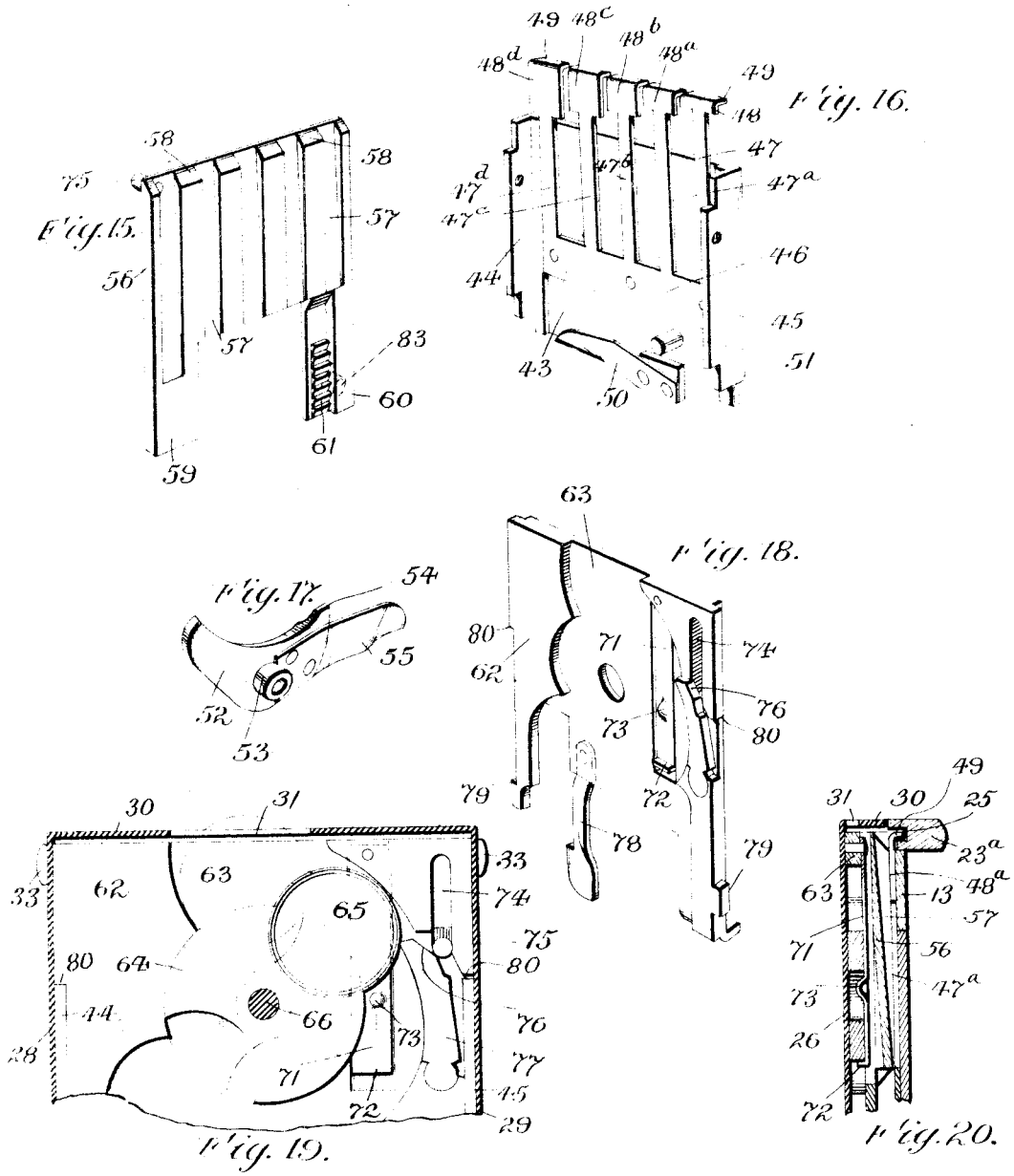

ALFRED W. ROOVERS, OF BROOKLYN, NEW YORK.

VENDING-MACHINE.

1,106,848.  Specification of Letters Patent.  Patented Aug. 11, 1914.

Application filed July 11, 1911. Serial No. 637,874.

*To all whom it may concern:*

Be it known that I, ALFRED W. ROOVERS, a citizen of the United States, residing at Brooklyn, in the county of Kings and State of New York, have invented certain new and useful Improvements in Vending-Machines, of which the following is a specification.

My present invention pertains to an improved vending machine, the construction and advantages of which will be hereinafter set forth, reference being had to the annexed drawings, wherein:

Figure 1 is a perspective view of the machine as viewed from the left, with one of the contained packages shown as released and partly protruded or projected; Fig. 2 a rear view of the body proper, the front plate and cover or door being removed. Fig. 3 a perspective view of the supporting bracket; Fig. 4 a perspective view of the body proper as seen from the front, one of the side walls being broken away to show the package-raising or ejecting mechanism; Fig. 5 a perspective view of the front plate as seen from the rear or inner face thereof; Fig. 6 a similar view of the cover or door; Fig. 7 a vertical sectional view, from front to rear, taken on the line 7—7 of Fig. 8, with the parts in their initial position after the machine has been charged or loaded; Fig. 8 a similar view, from side to side of the machine, on the line 8—8 of Fig. 7, looking toward the rear of the machine; Fig. 9 a view similar to Fig. 8, taken on the line 9—9 of Fig. 7, and looking toward the front of the machine; Fig. 10 a rear view of the actuating knob or handle, the spindle and supporting sleeve therefor being shown in section, such section being taken on the line 10—10 of Fig. 7; Fig. 11 a view similar to Fig. 7, taken on the line 11—11 of Fig. 12, the position of the parts being changed from that shown in Fig. 7, by the release of a single package of merchandise; Fig. 12 a view similar to Fig. 8, taken on the line 12—12 of Fig. 11 with the parts similarly positioned; Fig. 13 a sectional top plan, the sectional portion being taken on the line 13—13 of Fig. 11; Fig. 14 a horizontal sectional view on the line 14—14 of Fig. 12; Fig. 15 a perspective view of the latch-actuating plate; Fig. 16 a similar view of the latch-carrying plate, the lid latches and the locking dog or detent which holds the latch-actuating plate in its various positions; Fig. 17 a perspective view of the rocking or actuating pawl which lowers the latch-actuating plate step-by-step; Fig. 18 a similar view of the coin-way plate, the coin detector, the lock-out pawl and the resetting-lever or arm; Fig. 19 a sectional view illustrating the position of the parts when the lock-out pawl has been thrown out into the coin channel; and Fig. 20 a sectional view showing a washer as caught and arrested against further inward movement by the coin-detector.

The main object of the present invention is to produce a compact and efficient machine for vending merchandise, preferably in packages, such for instance, as the usual or now common five-cent packages of gum, the machine being especially adapted for use in theaters or the like, where it may be readily attached to the back of a seat or any other convenient place.

The machine is adapted to hold a plurality of packages and to vend the same one at a time, the release of one package in no wise affecting the others, access to the others being cut off and their release being securable only by the insertion into the machine in sequence of the proper number of coins of a predetermined value.

The main body or casing of the machine comprises a back 1, side walls 2, 3 and a bottom 4, said parts being preferably formed from a single piece of sheet metal stamped and bent to form. The back has struck out of it four rearwardly-extending substantially L-shaped ears 5, adapted to engage and interlock with four similarly shaped but reversely positioned ears 6, formed integrally with the body 7 of the supporting bracket, see Fig. 3. The outer members of said lugs or ears 6 are preferably given a slight inclination from the vertical so as to produce a wedging fit between the parts as the body or machine proper is forced down into locking engagement with the bracket, the bottom 4 finally coming into contact with and resting squarely upon the base piece 8 of the bracket. A notch 9 is formed in the forward edge of the base piece 8 for a purpose which will presently appear.

A plurality of vertically-disposed chambers or compartments, adapted to receive and house the merchandise to be vended, hereinafter referred to as the "package", are formed by a series of partitions 10, equally spaced between the side walls 2 and 3, see Fig. 4, said partitions extending down to the bottom 4. The upper ends of the walls 2 and 3 and likewise the upper end of each of said partitions is provided with an outwardly-extending ear, as 11, and a forwardly-extending ear or lug 12. A bar 13 extends across the front of the sides 2 and 3, and the partitions 10 immediately below the lugs 12, being sweated to said parts, thus firmly securing the members in their proper relation. A similar bar 14 is arranged across the forward edges of the partitions adjacent their lower ends, the ends of said bar being secured to the inner faces of the forwardly-projecting extensions or wings 15 and 16 of the sides 2 and 3.

An ejector mechanism is located in the bottom of each of the package-containing compartments and may be said to comprise a plate 17, having extending downwardly from two opposite sides or edges a pair of hook-shaped fingers 18 and 19, the hooked portions of each pair extending away from each other and adapted, when the plate is elevated, to engage two horizontally-disposed retaining bars or rods 20 and 21, which as will be seen upon reference to Fig. 4, pass through the partitions 10 at a slight distance from the lower ends thereof. A coil spring 22, interposed between the bottom 4 and the under face of the plate 17, acts to force the plate upwardly and to bring the hooks into contact with the limiting or retaining rods 20 and 21. The height of each compartment, when the plate 17 is depressed and the spring 22 compressed, is equal to the length of the package which is to be vended. Each compartment is provided with a hinged cover, adapted to close its upper end, said covers being designated by 23, 23ª, 23ᵇ, 23ᶜ and 23ᵈ. The covers are hinged upon a rod 24 passing through the various ears 11 of the sides 2 and 3 and the partitions 10. Each cover makes a close fit between the upper walls of its compartment, lying flush with the upper ends thereof when closed, see Fig. 4, and resting at its free or forward end upon the cross bar 13. The forward edge of each cover is notched or provided with a locking or latch-receiving groove, as 25.

The locking and releasing mechanism for the covers may be said in its broad sense to comprise a plurality of spring latches which normally engage and hold the covers in their locked or closed position, a movable latch-withdrawing plate adapted to release or withdraw the latches successively or one at a time, and means, rendered operative through the agency of a deposited coin, to move said plate step by step to withdraw the latches. A suitable resetting mechanism for the latch-withdrawing plate is also provided. Said mechanisms are attached to and carried by a front or supporting plate, shown in full in Fig. 5 and comprising a front member 26, the lower edge of which is thrown or curved outwardly to a slight extent, as at 27; two wings or side members 28 and 29, the lower portions of said sides being extended downwardly to make the sides substantially equal in length to the sides 2 and 3; and a narrow top plate 30, provided with a coin-slot 31. The upper end of each side 28 and 29 is provided with a curved slot 32, into which, when the supporting plate is positioned, passes the stem or body of a headed post or rivet 33, see Fig. 13, said posts being secured in the side walls 2 and 3 near the upper ends thereof.

A cover or closure, which also serves to lock the supporting or front plate in position, is shown in detail in Fig. 6, and comprises a front plate or member 34, the upper portion of which is curved inwardly, see Fig. 7, so that its upper edge may pass in beneath the curved edge or portion 27 of plate 26, two side wings 35 and 36 and a bottom plate 37.

The bottom plate is formed with an upstanding perforated tongue 38, adapted when the parts are assembled to pass upwardly through notch or slot 9, through a slot 39 formed in the bottom piece 4 and into alinement with a bolt 40 of a lock 41, see Figs. 4, 7, 8, 9 and 12, secured to the bottom plate 4. A plate 42 overlies the lock, extending from the wing or extension 15 to the wing 16, and this plate, together with the front wall 34 of the cover or door and the downward extensions of the sides 28 and 29 of the front plate, constitute the coin-receptacle into which the coins are discharged after the machine is operated.

The inclination of the plate 42, as shown, guides the coins to the right so that they will not clog the machine and stack up under the coin-way at the left. This receptacle makes provision for the coins and also slugs or the like which may be put into the machine with the view of operating the same.

The latch-supporting plate is shown in detail in Fig. 16. It comprises a front piece 43, having formed integrally therewith two wings 44 and 45, the height of the front being such that it fits closely in between the upper and lower cross-bars 13 and 14, see Figs. 7 and 11. The front plate 43 is thicker adjacent the corners than it is through its main portion, and secured to the face thereof is a cross-piece 46, from which extend upwardly five spring arms 47, 47ª, 47ᵇ, 47ᶜ and 47ᵈ, each being formed with a head, designated, respectively, by 48, 48ª, 48ᵇ, 48ᶜ and 48ᵈ, each head being larger or longer than the preceding one. Each head is formed with a laterally-extending tongue as 49, said tongues passing into the grooves 25 of the covers 23 et seq. when forced inwardly by the latch-actuating plate about to be described. The arms, heads and tongues form in effect latches adapted normally to hold the covers of the package closed. The latch plate also forms the support for a fixed locking pawl 50, formed of spring metal, the lower end of the pawl being straight, while the body at its outer end or active portion is thrown inwardly to a slight extent. A post or stud 51 also extends outwardly from the plate and forms the support upon which the actuating pawl is pivoted or fulcrumed. Said pawl (see Fig. 17) comprises an unyielding arc-shaped member 52 carrying a hub 53 adapted to encircle the stud 51. One end of said member has formed thereon a lug or tooth 54, see Figs. 8, 9 and 12, adapted as will be hereinafter set forth, to function with a coin to rock the member. Extending outwardly from the same end is a spring plate 55, which has substantially the same conformation as the fixed pawl.

The latches normally stand away from the covers, the spring arms serving to withdraw them. To force them inwardly and to hold them in their closed position, and to release them successively a latch-actuator is employed, comprising, as shown in Fig. 15, a rigid plate 56, provided in one face with a series of vertically-disposed grooves 57, one for each latch, the grooves being of a width slightly wider than the arms 47 et seq. but narrower than the heads of the latches. The grooves gradually deepen toward the top and the upper end of the plate, or the upper end of each bar or rib which defines the grooves is beveled, as at 58. Plate 56 is provided with two downwardly-extending arms 59 and 60, the forward face of the latter being cut away and a series of ratchet-teeth 61 produced or secured thereon. Said plate is of a width sufficient to pass in between the wings 44 and 45, the grooves or channels standing next to and in alinement with the respective spring arms 47 et seq.

While in its uppermost position, or that shown in Figs. 7 and 9, the beveled faces 58 have passed up beyond the heads 48 et seq.; consequently, the latches are thrown forward into locking engagement with the covers. As the plate is moved downwardly step by step the latches are successively released; this by reason of the beveled face 58 first passing below the lower margin of head 48, permitting the head through the action of the spring arm to move away from the cover and to withdraw the tongue from the cover, thereby releasing the same. This will take place with each latch in succession, the increasing depth of the heads insuring their release in regular order. The package will, as a cover is released, be ejected from such compartment, due to the action of the spring 22 upon the plate 17, it being understood that the spring is compressed as the package is forced downwardly and the cover closed.

This step-by-step downward movement of the actuating plate is effected by means of the rocking pawl which is rocked through the medium of a coin introduced into the machine. In Fig. 13 there is shown the coin-way plate, which coöperates with the pocket-wheel shown in Figs. 8, 12 and 19. The plate 62 is formed with a coin-way or channel 63 in one face thereof, the upper end of which stands beneath the coin-slot 31, said coin-way being enlarged to admit the placement therein of the pocket-wheel 64, said wheel being provided with two oppositely-disposed semicircular seats or pockets for the reception of the introduced coins, one of which is shown and designated by 65. Said wheel is made fast to a stub-axle or spindle 66, which extends inwardly from a knob or operating handle 67, said spindle passing through a bushing or sleeve 68, sweated or otherwise secured in an opening formed in the face plate 26.

A pair of ratchet teeth 69 are formed upon the fixed sleeve 68 and coöperate with a spring-pressed pawl 70, the arrangement of the teeth being such that the knob may be turned freely to the right at all times but cannot be turned counter-clockwise except for a limited distance. Such arrangement prevents one from placing a coin in the machine and moving it back and forth over the actuating pawl, thereby causing the same to rock up and down, and successively unlocking the various compartments of the machine. Plate 62 also has mounted in a recess formed therein, in line with the coin-way, a spring arm 71, the lower end of the arm being free and turned outwardly forming a tongue 72, while above said tongue the arm is provided with a rounded projection 73. The plate is also provided with a vertically-disposed slot 74 into and through which projects a pin 75 secured to the latch-actuating plate, see Fig. 15, near the upper end thereof. Said pin, as the latch-actuating plate 56 is moved through its last downward step in the act of releasing the last latch, comes into contact with the beveled face 76 of a rocking arm or detent 77, and throws it out into the coin-way, as clearly illustrated in Fig. 19, thus preventing a coin from being passed down into the coin receptacle after the machine or the packages have all been exhausted. A coin in the full-line position of Fig. 19 (at which time all the packages will have been released) may be elevated to the dotted-line position by a retrograde movement of the knob 67, where it may be grasped by the depositor and withdrawn.

Pivoted to the lower edge of plate 62 is a resetting lever 78, said lever (see Figs. 8, 9 and 12) standing adjacent to the fixed locking pawl 50 and the actuating pawl or spring plate 55. As will be noted, the lever stands to one side of the ratchet teeth 61, so as not to interfere with the normal action of the pawls. When, however, it is desired to elevate the latch-actuating plate 56, the attendant will press said lever in so as to throw the pawls 50 and 55 out of engagement with the teeth and then swing the lever laterally, carrying the enlarged or broadened end of the lever over into engagement with the arm or projection 60, whereby the pawls will be held out of contact with the teeth until the plate 56 is moved upwardly to its full extent. When the parts reach such position the enlarged end of lever 78 will pass off of the projection 60, and permit the pawls to automatically resume their operative relation with the ratchet teeth. It will be understood, of course, that the resetting lever need only be operated when the supply of packages in the machine is exhausted, at which time the door will be removed to abstract the coins.

The latch-actuating plate bears upon the latch plate, and the coin-way plate 62 overlies the same, the wings 44 and 45 or the reduced edges thereof, passing into recesses formed in the edges of the coin-way plate, formed by shoulders 79 and 80. Screws 81, passing through the wings 28 and 29 secure the front plate to the extensions 15 and 16 of the body, while screws 82 pass through the wings 28 and 29 into the wings 44 and 45 of the latch plate.

It is thought that the operation of the machine will be understood from the foregoing description, but a brief summary will be given. Assuming that the machine is fully charged, at which time the parts will be in the position shown in Figs. 7, 8 and 9, upon the deposit of a coin 65 the operator will turn a knob clockwise and the coin will be seated in one of the pockets of the coin-wheel and be carried around therewith in the coin channel, coming into contact with the then upstanding arm of the rocker member 52 of the movable pawl, forcing said member from the dotted-line to the full-line position, Fig. 8. This carries the pawl 55 upwardly one tooth, and as the coin is carried around it comes into contact with the tooth or lug 54 and the pawl is rocked or moved downwardly, carrying with it the latch-actuating plate 56. The parts are so proportioned that the plate will be moved downwardly to such an extent as to carry the beveled face 58 of the plate 56 below the lower edge of head 48, and immediately the cover 23 will be released as the tongue 49 is withdrawn through the action of the spring arm 47, which passes back into its groove or channel 57. The parts are then in the position shown in Figs. 12 to 14 inclusive.

As will be noted upon reference to Fig. 12, the rocker member of the actuating pawl will be so moved as to protrude into the coin path in a position to be actuated to cause its elevation one tooth, by the next inserted coin. It will likewise be seen that the fixed pawl has come into engagement with the second tooth, and the plate 56 will be held against upward movement which might take place owing to the frictional contact between the actuating pawl and the teeth as said pawl is moved upwardly. The same cycle of movements will take place until the packages are all discharged, when the machine will be recharged and the covers locked down by an upward movement imparted manually to the latch-actuating plate. This may be readily effected by taking hold of a pin or knob 83, Figs. 8 and 12, which extends outwardly from the arm 60.

Before the latch-actuating plate is moved up the lever 78 will be moved over into position to release the pawls 50 and 55 and the various covers turned downwardly together and held in such position by a stick or the like which should be coextensive of all of the covers.

A coin in passing through the coin-way will strike the projection 73 and depress the spring arm 71, withdrawing the tongue 72 out of the path of the coin. A washer, however, would be caught, as shown in Fig. 20.

As will be noted upon reference to Figs. 8, 12 and 17, the tooth 54 of the rocker-arm is thinned somewhat so that thin pieces or material of the correct diameter but of insufficient thickness will slip by the tooth without actuating the mechanism. Pieces too small in diameter will pass over the top of the tooth without moving the arm or lever, and soft material will be dented and pass through the machine without moving the arm, or at least, without moving it a distance sufficient to operate the mechanism.

Having thus described my invention, what I claim is:

1. In a vending apparatus, the combination of a plurality of receiving compartments adapted to hold merchandise to be vended; a closure for each compartment; a latch for each closure; a device for holding said latches closed and successively releasing the same; and means for actuating said device.

2. In a vending apparatus, the combination of a plurality of receiving compartments adapted to hold packages; a closure for each compartment; an ejector mechanism located in each compartment; a latch for each closure; and a device for holding said latches closed and successively releasing the same.

3. In a vending machine, the combination of a plurality of compartments each adapted to contain merchandise to be vended; a closure for each compartment; a latch for each closure; and a latch-holding and releasing device having a step-by-step movement and adapted at each step to release a latch.

4. In a vending machine, the combination of a plurality of compartments each adapted to contain merchandise to be vended; a closure for each compartment; a latch for each closure; a latch-holding and releasing device adapted to hold the latches in locking engagement and to successively release the latches; means for imparting a step-by-step releasing movement to said device; and means for normally preventing a retrograde movement of said device.

5. In a vending machine, the combination of a plurality of compartments each adapted to contain merchandise to be vended; a closure for each compartment; a spring latch for each compartment; and a latch-holding and releasing device having a step-by-step movement adapted to hold the latches in place and to release the same one at a time.

6. In a vending machine, the combination of a plurality of compartments; a closure for each compartment; a series of spring latches, one for each closure, said latches being normally movable away from the closures; a cam plate acting to force the latches into locking position; and means for moving said plate to release the latches.

7. In a vending machine, the combination of a plurality of compartments; a closure for each compartment; a series of spring latches, one for each closure, said latches normally springing into release position; a cam-plate for forcing the latches into locking position; and means carried by the latches and coöperating with the plate to successively release the latches upon a movement of the cam plate.

8. In a vending machine, the combination of a plurality of compartments; a closure for each compartment; a series of spring latches, each latch comprising a spring arm, a head, and a tongue extending from the head toward a slot in the corresponding closure, the spring arm serving to draw the tongue away from the slot; a latch-actuating plate located adjacent to the latches, said plate being provided with a series of grooves, one for each arm, the upper end of the plate being beveled and adapted to coact with the heads of the latches; a series of ratchet teeth carried by said plate; a locking pawl adapted to coact with said teeth; and a rocking pawl likewise in operative relation with said teeth.

9. In a vending apparatus, the combination of a suitable casing provided with end walls; a plurality of partitions equally spaced between said walls and thereby forming a series of compartments; a hinged lid or cover at one end of each compartment; a spring-pressed package-ejector located at the bottom of each compartment; a front or cover plate; a latch mechanism adapted to hold the various covers in their closed position; a latch-releasing device for releasing the latches successively; and means for moving said plate step-by-step to cause the same to function.

10. In a vending apparatus, the combination of a suitable casing divided into a series of package-receiving compartments; a cover for each compartment; a latch for each cover; a latch-actuating plate coöperating with said latches; a cover plate carrying said latches and plate; and a door engaging the cover plate and the casing and serving to secure the parts together.

11. In a vending machine, the combination of a suitable casing divided into a plurality of compartments; a cover for each compartment; a plurality of spring latches, one for each cover, said latches comprising a spring arm, a head, and a tongue extending outwardly from the head into operative relation with its corresponding cover, the heads being different in length; a latch-actuating plate having a series of grooves in its face, one for each spring arm, the upper end of said plate being beveled; a series of ratchet teeth carried by said plate; a spring pawl carried by a fixed portion of the apparatus and engaging the teeth; a rocking pawl likewise engaging the teeth; and a pivoted releasing lever standing adjacent to said pawls and adapted to be swung inwardly between said pawls and the teeth to release the pawls.

In testimony whereof I have signed my name to this specification in the presence of two subscribing witnesses.

ALFRED W. ROOVERS.

Witnesses:
 HERNRY V. RAYMOND, Jr.,
 REMSEN RUSHMORE.